(12) United States Patent
Moos et al.

(10) Patent No.: US 9,790,788 B2
(45) Date of Patent: Oct. 17, 2017

(54) APPARATUS AND METHOD FOR PREDICTING PROPERTIES OF EARTH FORMATIONS

(75) Inventors: Daniel Moos, Palo Alto, CA (US); Colleen Barton, Portola Valley, CA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 894 days.

(21) Appl. No.: 12/638,177

(22) Filed: Dec. 15, 2009

(65) Prior Publication Data

US 2010/0286918 A1 Nov. 11, 2010

Related U.S. Application Data

(60) Provisional application No. 61/175,764, filed on May 5, 2009.

(51) Int. Cl.
*G01N 15/08* (2006.01)
*E21B 49/00* (2006.01)
*E21B 43/25* (2006.01)
*G01V 11/00* (2006.01)

(52) U.S. Cl.
CPC ............ *E21B 49/008* (2013.01); *E21B 43/25* (2013.01); *G01V 11/00* (2013.01); *G01V 2210/6163* (2013.01)

(58) Field of Classification Search
CPC ........ E21B 49/008; E21B 43/25; E21B 49/00; G01N 15/0826
USPC .......................................................... 702/12
See application file for complete search history.

(56) References Cited

U.S. PATENT DOCUMENTS

| | | | |
|---|---|---|---|
| 4,845,981 A | * | 7/1989 | Pearson ...................... 73/152.31 |
| 2004/0060351 A1 | * | 4/2004 | Gunter et al. .............. 73/152.05 |
| 2008/0210420 A1 | * | 9/2008 | Ramakrishnan et al. ......................... 166/250.02 |
| 2009/0065253 A1 | * | 3/2009 | Suarez-Rivera et al. ....... 175/50 |
| 2012/0150515 A1 | * | 6/2012 | Hariharan et al. ................ 703/7 |

OTHER PUBLICATIONS

Barton, et al. "Geomechanical Wellbore Imaging: Key to Managing the Asset Life Cycle". From AAPG Memoir on Dipmeter and Borehole Image Log Technology, Poppelreiter et al. eds. 2008 in press. 50 pages.
Moos, D. and C.A. Barton, Modeling uncertainty in the permeability of stress-sensitive fractures, ARMA 2008, San Francisco, CA, Jul. 1-3, 2008.

* cited by examiner

*Primary Examiner* — Michael Nghiem
(74) *Attorney, Agent, or Firm* — Cantor Colburn LLP

(57) ABSTRACT

A method of predicting a property of an earth formation includes: injecting a fluid into at least one pre-existing feature of the formation at a plurality of constant pressures or flow rates; measuring a response from the at least one pre-existing feature at each of the plurality of constant pressures or flow rates; and estimating at least one property of the at least one pre-existing feature based on the response. An apparatus for predicting a property of an earth formation is also disclosed.

24 Claims, 8 Drawing Sheets

APPARATUS AND METHOD FOR PREDICTING PROPERTIES OF EARTH FORMATIONS

CROSS REFERENCE TO RELATED APPLICATION

This application claims priority to U.S. provisional application No. 61/175,764, filed May 5, 2009, under 35 U.S.C. §119(e), which is incorporated herein by reference in its entirety.

BACKGROUND

The invention disclosed herein relates to exploration for oil and gas and, in particular, to techniques for stimulating production from sub-surface materials that contain reservoirs of hydrocarbon materials.

Hydraulic stimulation is used to improve productivity of hydrocarbon formations, such as low permeability reservoirs including shale gas reservoirs. At present there are no proven methods other than trial and error for optimizing the design of formation treatments with respect to, for example, well spacing, completion selection, fluid type, pumping schedule, proppant type, etc.

SUMMARY

Disclosed herein is a method of predicting a property of an earth formation. The method includes: injecting a fluid into at least one pre-existing feature of the formation at a plurality of constant pressures or flow rates; measuring a response from the at least one pre-existing feature at each of the plurality of constant pressures or flow rates; and estimating at least one property of the at least one pre-existing feature based on the response.

Also disclosed herein is an apparatus for predicting a permeability of an earth formation. The apparatus includes: an injection mechanism configured to inject a fluid into at least one pre-existing feature of the formation; a pumping mechanism configured to adjust at least one of a pressure and a flow rate at which the injection mechanism injects the fluid; a sensor for estimating at least one of a pressure and a flow rate of the at least one pre-existing feature; and a processor configured to measure a response from the at least one pre-existing feature at each of a plurality of constant pressures or flow rates, and estimate at least one property of the at least one pre-existing feature based on the response.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Disclosed are apparatuses and methods for characterizing the response of a formation and/or a pre-existing formation feature, such as a feature and/or formation including a reservoir of hydrocarbons, to stimulation. The system and method uses a "pre-test" or "pre-stimulation test" to estimate flow properties (such as permeability) and flow property changes as a result of stimulation pressure. As described herein, "stimulation" may include any injection of a fluid into a formation, which includes at least one pre-existing feature in the formation such as a fault, a bedding, a foliation or a fracture. A fluid may be any flowable substance such as a liquid or a gas. Stimulation may result in an increase in permeability or other flow properties of the pre-existing feature and the formation to some degree, and in some instances may include cracking or fracturing the formation and/or causing a slip in a fracture. Stimulation, in some instances, may result in a decrease in permeability, such in relation to fractures whose width has been enhanced by dissolution. The system and method provides for designing a stimulation procedure by using a pre-test, and applying that knowledge to design and carry out the stimulation itself. The result is improved productivity, better recovery, and more accurate predictions of ultimate recovery.

Apparatuses and methods are also disclosed for modeling the stimulation as well as the production response for a reservoir of hydrocarbons (i.e., oil and/or gas), for example, where the surrounding geologic formations have low permeability. One non-limiting example of a low permeability reservoir is a reservoir bound in shale.

Generally, the apparatuses and methods may make use of knowledge of characteristics of geologic formations and provide for predicting changes in properties of the formations and/or the pre-existing features as a function of pressure before, during, and after stimulation. Flow properties such as injectivity, conductivity and permeability may be modeled as a function of the maximum pressure achieved during the stimulation. The information gained by the apparatuses and methods allows for improved design of stimulation procedures. In addition, for any given stimulation design, prediction of a shape of the region affected by the stimulation is achievable (generally as a function of position within the stimulation region). Further, users may estimate the stimulation efficiency for any given procedure.

Figure 1:
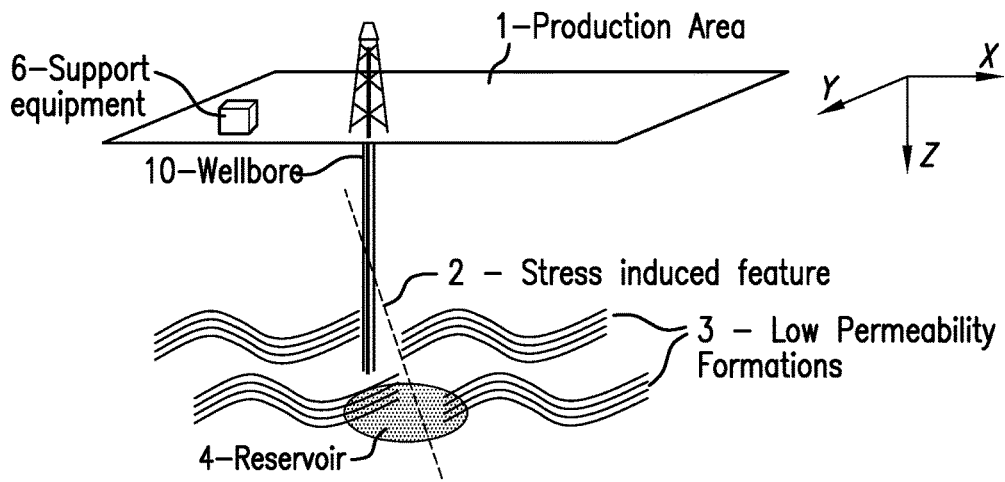
FIG. 1 depicts aspects of a production area for exploration.

FIG. 1 illustrates aspects of a production area 1. The production area 1 defines an area where exploration for hydrocarbons is performed. The production area 1 is located over a plurality of sub-surface materials, referred to as "formations." In one example, the formations include generally low-permeability formations 3, such as shale. The low-permeability formations 3 may include any type of geologic environment, which has low porosity, and therefore reduced migration of fluids such as hydrocarbons (e.g., gas and/or oil) and water.

The formations often include a variety of pre-existing features 2 such as stress induced or depositional features and geologic formations such as the low-permeability formations 3. Examples of stress induced features include faults, fractures and the like. A plurality of the pre-existing features may be referred to as a "network." Exploration in the production area 1 calls for drilling at least one wellbore 10 into the sub-surface materials. Accordingly, reaching deposits of hydrocarbons, such as the reservoir 4 in this example that contains hydrocarbons, may call for traversing the features 2 as well as the low permeability formations 3.

In typical production, a variety of instrumentation may be lowered into the wellbore 10 after drilling (e.g., wireline deployment), or included within a drill string. The instrumentation is generally deployed with additional support equipment 6. Exemplary support equipment includes, without limitation, processing and computing equipment, measuring equipment, communications equipment, power supplies, fluid supplies and the like.

The instruments deployed downhole may rely on technology including at least one of resistivity, nuclear magnetic resonance (NMR), acoustic, seismic, nuclear (e.g., pulsed neutron, gamma sources, and the like) as well as other such technologies. Parameters associated with various aspects of formations and/or features may be estimated with such instruments. Exemplary parameters include, for example, density, temperature, pressure, porosity, isotopic identity, chemical composition, pH, conductivity, resistivity, stress, strain and the like. Exemplary parameters may also include structural parameters such as grain size and structural characteristics of features such as bedding, fractures, faults and others.

Such instruments have proven to be valuable in collecting information regarding such aspects in the form of characterization data. As discussed herein, the characterization data may be used to derive geomechanical models. The geomechanical models may then be used as an input to systems described herein.

To provide some further perspective, an overview and some general considerations are now provided.

An accurate geomechanical earth model (GEM) includes constraints on stress magnitudes and orientations, mechanical rock properties, and the orientations and characteristics of natural fractures or other features, such as fracture strength and flow properties. Having an accurate geomechanical earth model is important for understanding reservoir response to stimulation and production in low permeability reservoirs such as gas and oil shales. This is because in these reservoirs, response is controlled largely by the properties of natural and induced fracture networks, which are in turn controlled by the in-situ stresses and by fracture characteristics such as distribution, width, stiffness and strength.

Consider the following aspects regarding characterizing stresses and natural fractures. The most commonly used methods to derive geomechanical models use as input elastic properties determined using a combination of conventional and crossed-dipole acoustic logs. However, these methods are based on overly simplified models for reservoir response to stress and deformation, and therefore require confirmation, often using observations of stress-induced features (e.g., breakouts and drilling-induced tensile wall fractures) in image logs. Furthermore, identifying and characterizing fractures requires direct observation using either wellbore image data or information collected from core sampling. Independent characterization of fracturing and stress derived from wellbore image analyses also makes it possible to differentiate the cause of seismic anisotropy often observed in surface seismic surveys. For example, users are able to determine if the anisotropy is stress-induced or structural/fracture-induced. Regardless, accurate information on the distribution and orientations of natural fractures and on the magnitude and orientation of the in-situ stresses is needed in order to use geomechanics for understanding reservoir response to stimulation and predicting production.

It is increasingly recognized that the more permeable natural fractures are often those that are well oriented to slip (i.e., are shear fractures), rather than those, which have the lower applied normal stress (i.e., Mode I fractures). When slip is induced on these fractures, their aperture increases and their sensitivity to pressure decreases. In other words, slipped fractures are both more permeable and less susceptible to a decrease in conductivity with depletion.

The pressure required to initiate shear slip on any fracture can be computed if stress magnitude and orientation, fracture orientation, and fracture strength are known. In general, and for many fracture orientations, the pressure required to induce slip is lower than the pressure required to open Mode I types of fractures. The broad zones of microseismicity often induced by stimulation, and the characteristic focal mechanisms of events, confirm that the increase in pressure can not only induce hydraulic fractures but it also can induce slip on pre-existing natural fractures, which in turn results in an increase in their conductivity.

Figure 2A:
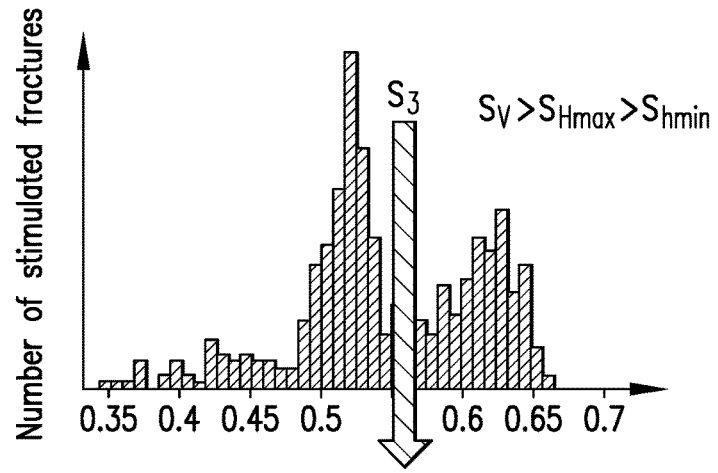
FIG. 2A and FIG. 2B, collectively referred to herein as FIG. 2, illustrate that the pressure required to induce fracture slip in a formation is a strong function of the in-situ stress state.
Figure 2B:
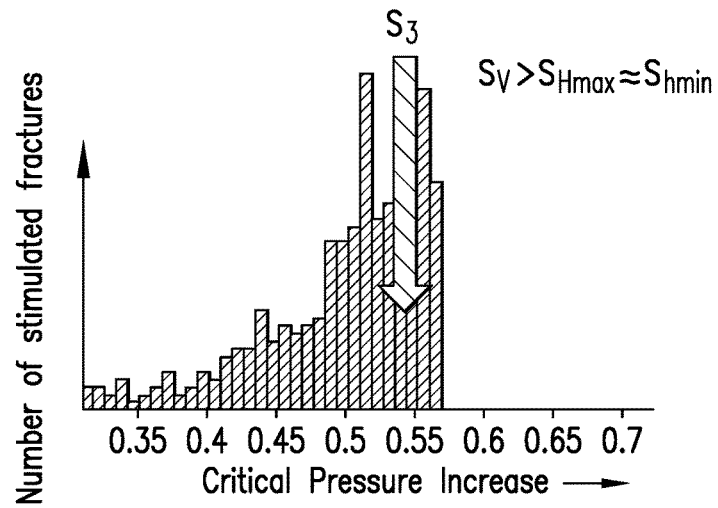

FIG. 2 is a histogram depicting influence of the stress state on the ability to stimulate natural fractures in an exemplary shale gas reservoir. The fracture properties (strengths, distributions, and orientations) are identical. However, in FIG. 2A, there is a large difference in the two horizontal stresses, and in FIG. 2B, the two horizontal stresses are nearly equal and significantly lower than the vertical stress. When both horizontal stresses are low, nearly all of the fractures in this reservoir can be stimulated using pressures that are lower than the least principal stress. This is a situation in which long-term pumping at modest pressures is expected to significantly enhance permeability of formations where the reservoirs reside. On the other hand, if the maximum horizontal stress is closer to the vertical stress, only a subset of natural fractures can be stimulated before the injection pressure induces and propagates hydraulic fractures. In order to deliver more substantial improvements in reservoir performance by shear-enhanced stimulation, fractures which have slipped should have significantly higher permeabilities than those that have not slipped.

Figure 3:
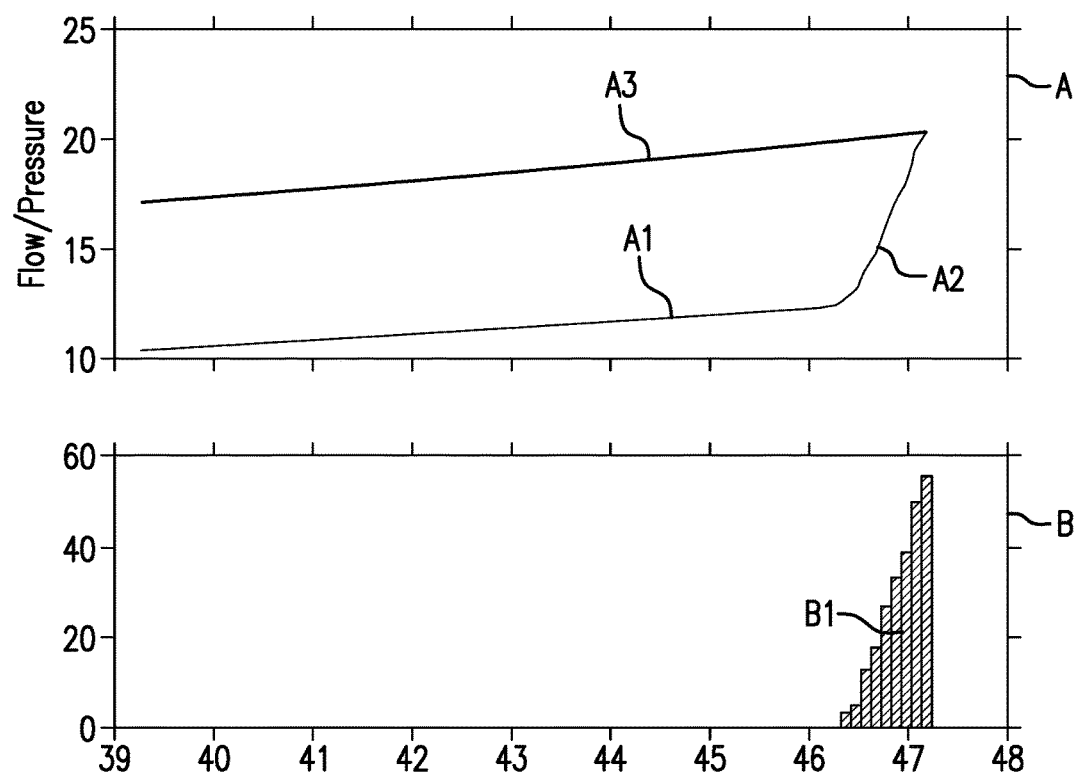
FIG. 3 illustrates effects of well stimulation at pressures below the least principal stress.

FIG. 3 illustrates a case in which fracture slip induces a permanent increase in conductivity. This case models the effect of raising the reservoir pressure from ambient pressure (about 39 MPa) to slightly above 47 MPa by, for example, pumping slick-water downhole and into a formation. The upper plot "A" shows a measure of well productivity, while the lower plot "B" is a histogram of the number of stimulated fractures as a function of injection pressure. The number of stimulated fractures is shown in the histogram B as bars "B1". The least principal stress is 52 MPa, so the pressure during the entire period of stimulation is always below that required to initiate a hydraulic fracture. Prior to the onset of slip on any of the fractures, productivity increases slowly with pressure (as shown by line "A1"), consistent with the fact that fractured reservoirs have pressure-sensitive permeability. Once fractures begin to slip, productivity increases rapidly (as shown by line "A2"), and, when the pressure is reduced at the conclusion of stimulation (as shown by line "A3"), the slipped fractures maintain their conductivity. In one embodiment, in order to utilize predictions based on this model in a quantitative way, three things should be known:
1. The magnitudes and orientations of the principal stresses;
2. The distributions, orientations and strengths of features such as natural fractures; and
3. The flow properties (e.g., aperture and stiffness) of the features in their natural state and after they have slipped.

Figure 4:
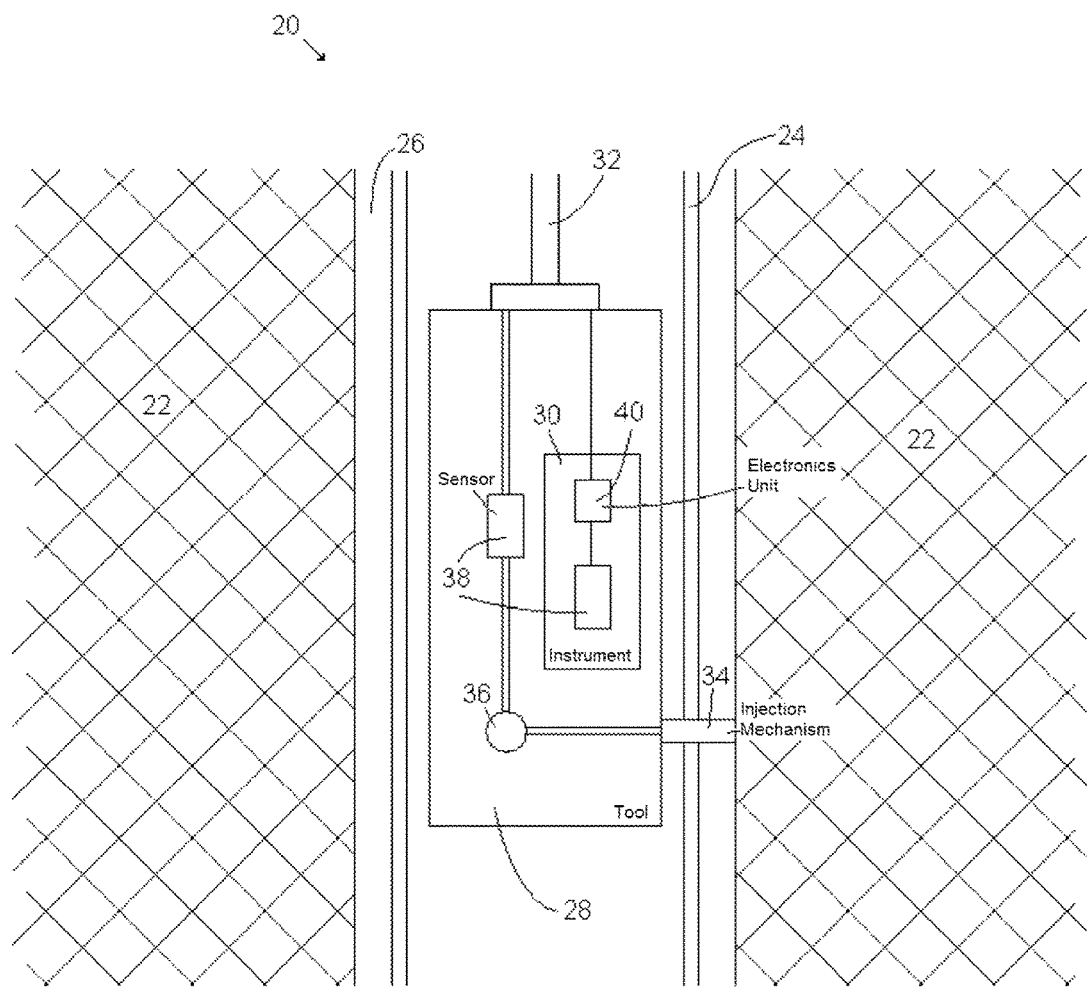
FIG. 4 depicts aspects of an exemplary embodiment of a system for hydrocarbon production and/or evaluation of an earth formation.

FIG. 4 illustrates aspects of an exemplary embodiment of a system 20 for hydrocarbon production and/or evaluation of an earth formation 22. An exemplary earth formation is the formation of FIG. 1, which includes one or more of pre-existing features such as the stress induced features 2, low permeability formations 3 and the reservoir 4.

The system 20 includes a borehole string 24 disposed within a borehole 26. As described herein, "string" refers to any structure or carrier suitable for lowering a tool or other component through a borehole or connecting a drill bit to the surface, and is not limited to the structure and configuration described herein. For example, the string 24 is configured as a drillstring, hydrocarbon production string or formation evaluation string. The string 24, in one embodiment, includes a plurality of string segments or is a continuous conduit such as a coiled tube. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's and drill strings.

A tool 28 includes one or more instruments 30 for measuring various properties of the formation 22, which can measure when located downhole or at a surface. Examples of such instruments 30 are described above. In one embodiment, the tool 28 is incorporated into the string 24 and deployed therewith. The tool may also be deployed as part of a drillstring in a measurement-while-drilling (MWD) operation. The tool 28 may be deployed in any suitable manner, such as via a wireline 32. The wireline 32, in one embodiment, includes various components such as conductors to provide power and/or communication between a surface processor and the tool 28, and fluid conduits for providing drilling, stimulation or other fluids downhole. In one embodiment, the tool 28 and/or the string 24 includes an injection mechanism 34 configured to introduce fluid into the formation 22, for example, to stimulate and/or fracture the formation 22. The injection mechanism 34, in one embodiment, is connected in fluid communication, via a fluid conduit 35, with a pump 36. The pump 36 may be located downhole or at a surface location, and may be in fluid communication with fluid in the borehole 26, the string 24 or a surface fluid source such as a mud pit.

In one embodiment, the tool 28 includes at least one sensor 38, such as a flow rate sensor, a seismic sensor a resistivity sensor and others. The sensor 38 is incorporated into the instrument and/or in communication with fluid flow through the tool 28 and/or the borehole 26. In one embodiment, an electronics unit 40 is included in the tool 28, for example as part of the instrument 30. The electronics unit 40 is configured to receive, store and/or transmit data generated from the sensor(s) 38. The electronics unit 40, in one embodiment, includes processing components configured to analyze the data, for example, to calculate permeability and/or permeability changes. The electronics unit 40 includes any number of suitable components, such as processors, memory, communication devices and power sources.

Figure 5:
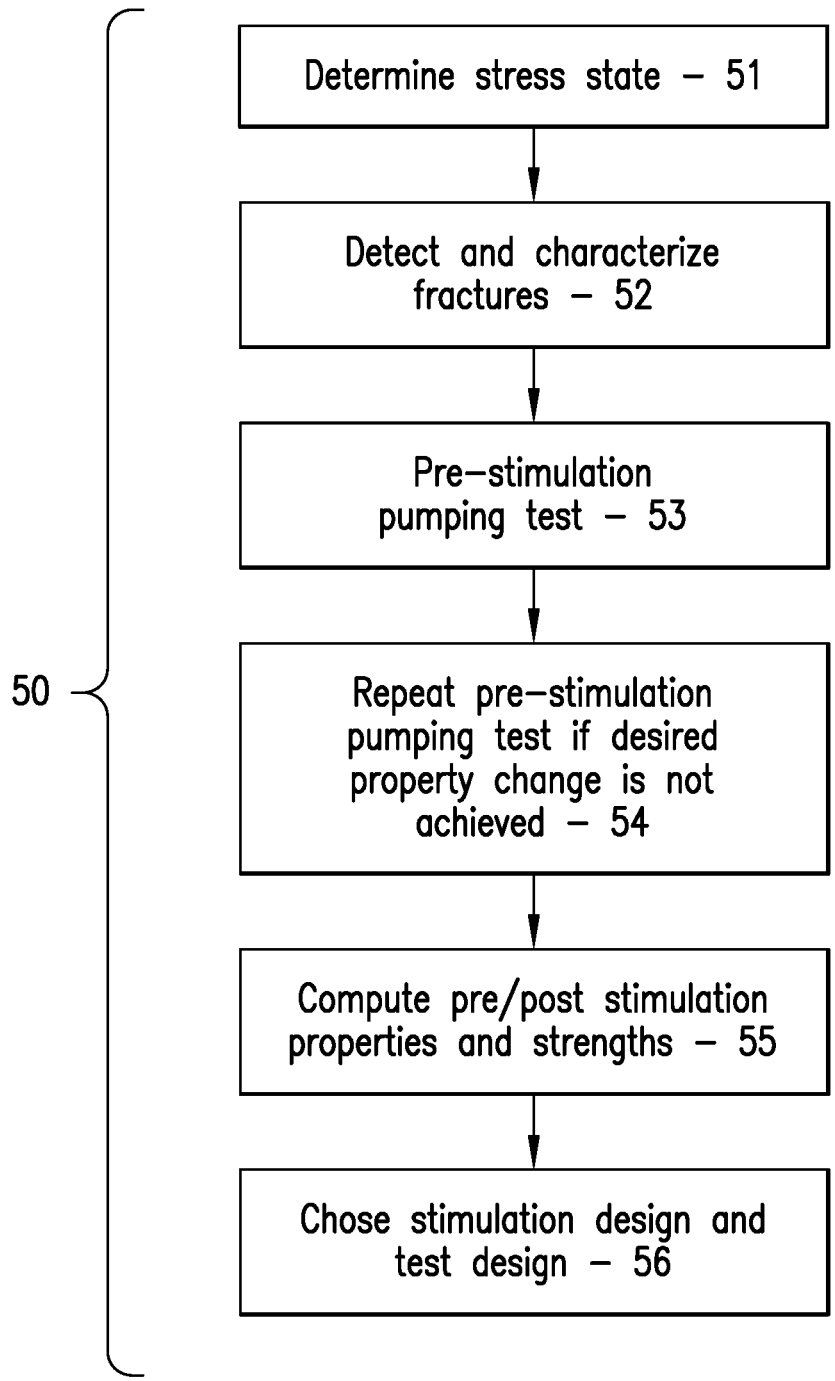
FIG. 5 is a flow chart providing an exemplary method for predicting flow properties and/or for stimulation of earth formations and/or features.

FIG. 5 provides an exemplary method 50 for predicting flow properties and/or for stimulation of pre-existing features and/or formations such as low-permeability formations. The method 50 may be used in conjunction with the system 20 and/or the tool 28, but may also be used with any suitable apparatus or system capable of injecting fluid into a formation and measuring permeability and/or other characteristics of an earth formation. In one embodiment, the method 50 includes the execution of all of stages 51-55 in the order described. However, certain stages may be omitted, stages may be added, or the order of the stages changed.

In the first stage 51, the stress state is determined. Techniques for determining stress within formations are generally known, and as such are not discussed in greater depth.

In the second stage 52, characteristics of fractures or other pre-existing features, such as orientations, locations, and frequency are detected and characterized. In addition, other characteristics such as strength properties of the pre-existing features may be estimated. Exemplary techniques for characterization and estimation include: considering strength properties based on whether or not there is evidence for slip at the wellbore due to drilling mud weight pressures (such as by using known mud weights, images of fractures and associated wellbore failures, and the constrained stress state; also by collecting evidence of slip, such as breakout rotation; as well as evidence of fluid invasion (from traditional characterizations, such as with resistivity, acoustic, or other instruments) Estimation of strength properties may also be made by surface measurements; as well as by deploying dedicated devices to detect onset of slip (such as by monitoring for creation of a resistivity anomaly or an optical or acoustic anomaly). Other known techniques include isolation of a fracture or other feature, raising fluid pressure and monitoring a resistivity image of the wellbore. In this case, when the fracture slips, resistivity changes and the pressure required and known stress can be used to compute strength, using single or multiple tests. Further, pulse test recording of downhole pressure may be used by listening for slip events micro seismically. In this case, one can sequentially inject larger and larger slugs of fluid, to raise local pressure higher and higher, and detect near-well events using a string of geophones in the treatment well, where focal mechanisms are then constrained to invert for strength from known fluid pressure and known stress. Optionally, model injection behavior may be estimated to compute pressure local to the well at the time and position of each event. In this case, pre-injection permeability, fracture strength, and post-injection permeability change is constrained through combined use of micro seismic information during pulse testing and flow modeling. After sufficient stimulation, re-testing with pulses of lower pressure may be performed.

In the third stage 53, a pre-stimulation pumping test is performed. The pre-stimulation test includes injecting a fluid into the formation and/or a pre-existing feature in the formation at a plurality of constant flow rates or pressures, and measuring the formation response. The measured formation response allows one to estimate various properties of the formation and/or feature based on the formation response. For example, the pre-stimulation test includes injecting the fluid with a series of constant flow rates and measuring the response, i.e., the pressure required to maintain each constant flow rate. In another example, the pre-stimulation test includes injecting the fluid with a series of constant pressures and measuring the response, i.e., the flow rate for each pressure.

In the fourth stage 54, determination of the formation response from stage 53 is used to determine whether a desired property enhancement (for example, a permanent improvement in permeability at a given pressure by stimulation at a higher pressure) has been achieved. In one embodiment, the formation response is compared to a desired response. For example, the measured injectivity or other property of the formation after the pre-stimulation test is compared to a desired property. If the measured property does not sufficiently conform to the desired property, the pre-stimulation test may be repeated at higher pressures and/or flow rates.

In the fifth stage 55, pre-stimulation and post-stimulation fracture properties or other feature properties are evaluated. Examples of such properties include flow properties such as injectivity (the amount of pressure required to achieve a given flow rate), permeability (the ability of a formation or feature to transmit fluids), flowability (capability of a fluid to move by flow), conductivity (the ease with which a fluid can move through the formation, depending on permeability and on the degree of saturation). In some instances, the flow property of a specific feature is expressed as conductivity, where the flow property of a formation volume having multiple features is expressed as permeability. The flow properties may be determined using, for example, a reservoir simulator configured with an appropriate model for the flow property, and matching the pressure and flow rate data from the appropriate part of the previous stages.

Another example of a formation property is feature strength, such as fracture strength. In one embodiment, feature strength is estimated based on pressure variations in the formation. For example, after the pre-stimulation test is performed in stage 53, formation permeability is computed as described in stage 55, and feature strengths are estimated based on the permeability vs. pressure data. Microseismic events such as fracture slips can also be recognized based on observed permeability changes. This analysis can be used to identify "weak faults", such as those exhibiting low feature strengths and indicating seismic events. The areas of the formation that include such weak faults may then be identified and isolated from the remainder of the formation. Exemplary methods for estimating feature strength and permeability are described in Moos, D. and C. A. Barton, "Modelling uncertainty in the permeability of stress-sensitive fractures", ARMA 2008, San Francisco, Calif., Jul. 1-3, 2008.

In the sixth stage 56, a stimulation protocol is selected or designed. This is generally performed using information from the first, second and fifth stages. Considerations include determining whether the protocol delivers sufficient production as a function of time, as well as desired total production. If the protocol is not adequate, then the protocol may be modified accordingly. Design considerations include, for example: whether stimulation results in a sufficiently large permeability improvement, and if proppant is needed to maintain natural fracture permeability. Other design considerations may include the shape of a region, which can be used to facilitate designing stimulation distribution, such as the spacing between wells and between stimulation points along a wellbore. The shape of a region can also be a consideration in choosing a completion method, such as methods using perforations in cemented casings and methods using selectively isolated open wellbore sections. Ultimately, results provide a design for conducting stimulation; drilling wells at orientations and spacings according to the design; as well as completing wells according to the design. Further results include economic benefits realized by coordinated assessment of the field, with a result of economic decision making, among other things.

Figure 6:
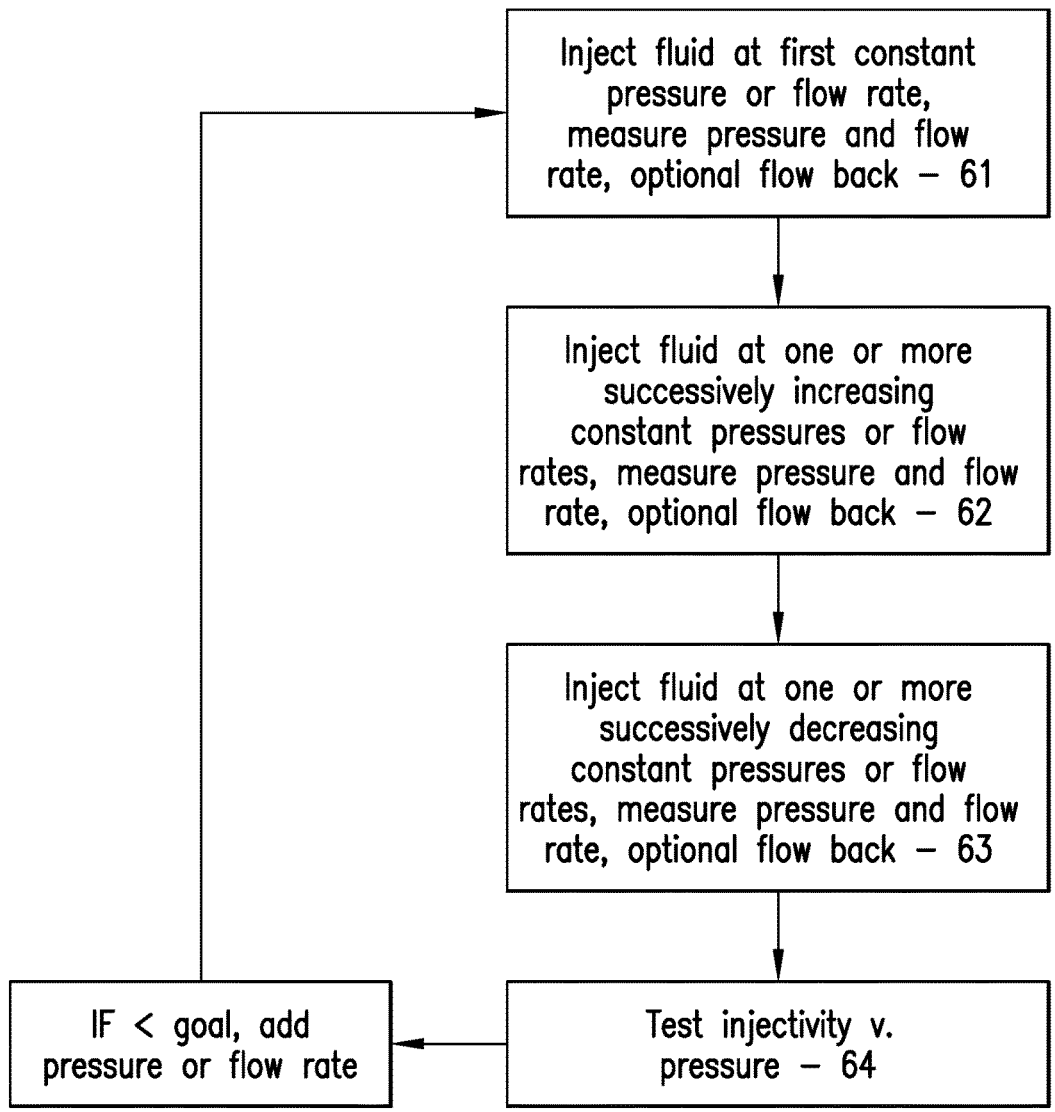
FIG. 6 is a flow chart providing an exemplary portion of the method of FIG. 5.

Referring to FIG. 6, in one embodiment, the pre-stimulation test 53 includes a number of stages 61-65. The test 53 may include the execution of all of stages 61-65 in the order described. However, certain stages may be omitted, stages may be added, or the order of the stages changed.

In the first stage 61, a pre-stimulation or other fluid is injected or pumped into the pre-existing feature and/or formation at a first constant flow rate for a specified period of time. The flow rate and pressure (e.g., the pressure required to maintain the constant flow rate) during the specified period of time is recorded. Alternatively, during the specified period of time, the fluid may be injected at a first constant pressure, and the flow rate (e.g., the flow rate required to maintain the constant pressure) and pressure is recorded. In one embodiment, the first constant pressure is slightly higher than the formation or feature pore pressure. After this specified period of time, the fluid may optionally be allowed to flow back or the pressure may be allowed to fall off.

In the second stage 62, the fluid is injected at a second constant flow rate or pressure during a second period of time, and the flow rate and pressure during the second period of time is recorded. The second constant flow rate or pressure is greater than the first constant flow rate or pressure. Stage 62 may be repeated as desired for any number of successively higher constant pressures or flow rates until a selected maximum flow rate or pressure is achieved. After each successive injection, the fluid may optionally be allowed to flow back or the pressure may be allowed to fall off.

In the third stage 63, the fluid is injected at one or more lower constant flow rates or pressures relative to the maximum flow rate or pressure. At each lower constant flow rate or pressure, the flow rate and pressure is recorded. Stage 63 may be repeated as desired for any number of successively lower constant flow rates or pressures.

During or after each of the stages 61-63, flow back or fall off may be permitted at a constant, lower pressure relative to the injection pressure by, for example, choking the flowback. In one embodiment, at least some flow back or fall off is conducted for computing properties such as formation permeability.

In the fourth stage 64, injectivity values are calculated based on the flow rates and pressures measured in stages 61-63. The injectivity values are compared or otherwise analyzed to determine the response of the formation and/or feature to the pre-stimulation injections. For example, the injectivity values may be fit to a model to compare the injectivity of the formation and/or feature during and after pre-stimulation. If the injectivity values are less than a desired injectivity value, then stages 61-64 may be repeated using higher pressures or flow rates.

Figure 7:
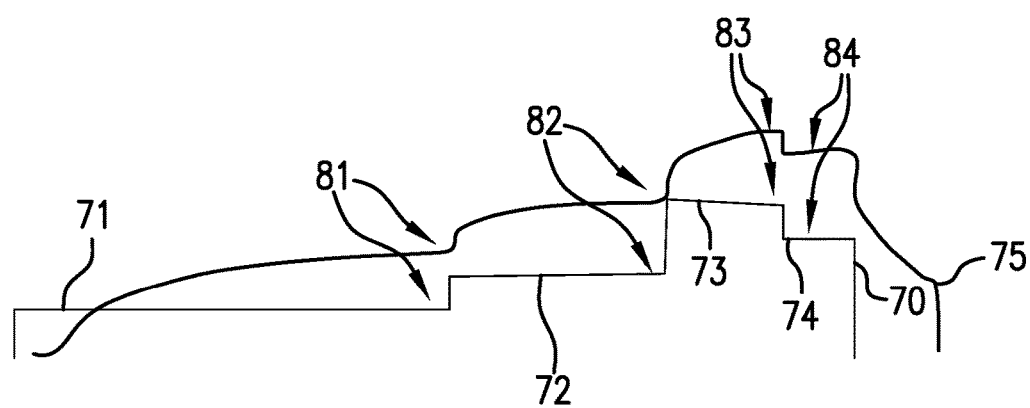
FIG. 7 is a diagram illustrating exemplary flow rate and pressure data in relation to the method of FIG. 6.

FIG. 7 illustrates an example of a pre-stimulation injection protocol performed via method 60. This protocol is exemplary, as any of various injection protocols may be used to determine the formation response. Such protocols may include any number of steps and any desired configuration of successive pressures or flow rates.

In this example, the pre-stimulation test includes four rate steps, each representing an injection of fluid over a respective time period at a constant flow rate. Line 70 shows the value over time of the flow rate during the pre-stimulation test. The flow rate is held constant by an operator or controller during each rate step 71, 72, 73 and 74. As shown, the first three rate steps 71-73 are maintained at successively increasing constant flow rates, where rate step 73 represents a selected maximum constant flow rate. After the maximum flow rate is achieved, the fourth rate step 74 is maintained at a constant flow rate that is lower than the maximum flow rate. Successively lower flow rate steps may also be performed. Curve 75 represents the pressure required to maintain the flow rate at each rate step.

Figure 8:
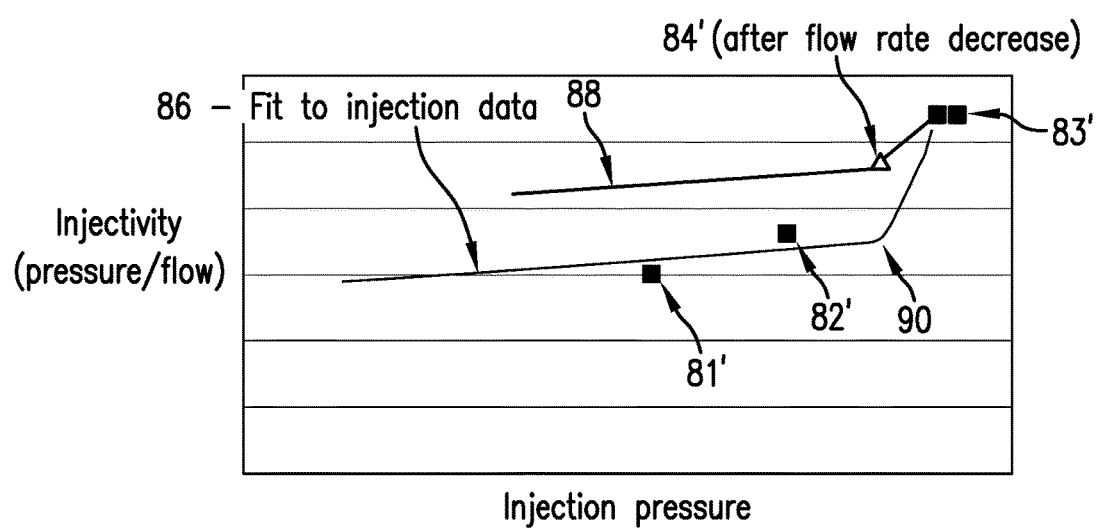
FIG. 8 is a chart showing a flow rate model.

Referring to FIG. 8, the formation response is determined. This determination may be made by modeling the flow rate and pressure data using a model, such as that shown in FIG. 8. The method for determining formation response described herein is exemplary, as any suitable method or calculation may be used.

In this example, the pressure and flow rate are recorded at selected time periods 81, 82, 83 and 84 shown in FIG. 7. The pressure and flow rate measurements at each of the time periods 81, 82, 83 and 84 are calculated and represented as data points 81', 82', 83' and 84' respectively. In this example, each data point represents the computed injectivity (i.e., the ratio of flow rate to pressure) at a given injection pressure for the four injection intervals or rate steps.

The data points 81'-84' are plotted to match the pressure and flow rate data, which allows the fracture strength, other feature properties and/or flow properties to be estimated. A model represented by curves 86 and 88 is fit to the data points 81'-84'

Curve 86 represents the formation response during rate steps 71-74, whose slope is controlled by the flow properties of the fracture, formation or other feature before and after it is stimulated. The curve 88 represents the formation response during and after rate step 74.

In one embodiment, the model fit of curve 86 is controlled by fracture strength. For example, the slope of curve 86 (the increase of injectivity with increasing pressure) is small at lower pressure, where no fractures have been stimulated. At a certain pressure, fractures begin to be stimulated and there is a corresponding sharp increase in injectivity, shown at the "knee" 90 in the curve 86. The pressure at which this knee 90 occurs is the pressure at which fractures begin to be stimulated. At pressures higher than the knee 90, the slope of the curve 86 is much steeper, indicating that once fractures begin to be stimulated, the injectivity increases much more rapidly with pressure. The slope of the curve 86 below the knee 90 is controlled by how the pre-stimulation fracture conductivity varies as a function of pressure, and the slope above the knee 90 is controlled by the number of fractures stimulated and by the post-stimulation variation in conductivity with pressure. Since the knee 90 constrains the fracture strengths, fracture strength can be determined independently from the post-stimulation fracture flow properties. Seismicity may begin to occur at the knee pressure, and thus microseismic monitoring provides a useful constraint of the model.

Curve 88 represents the time period after the maximum injection rate has been achieved (which could be a preselected value of injectivity or could be selected by other criteria). The rate step 74 (and any other following rate steps) occurs at steadily decreasing flow rates. Curve 88, fit to the flow tests at decreasing rates, is controlled by the properties of the fractures after they have been stimulated (provided that stimulation occurs), providing an independent constraint on those properties.

In one embodiment, if curve 88 plots above curve 86, then the injectivity of the formation and/or feature will be higher after the pre-stimulation test than before. If the injectivity increase does not meet the desired increase in formation properties, the test can be repeated at a higher pressures or flow rates, or the decision may be made to try a different technique or abandon the feature.

Figure 9:
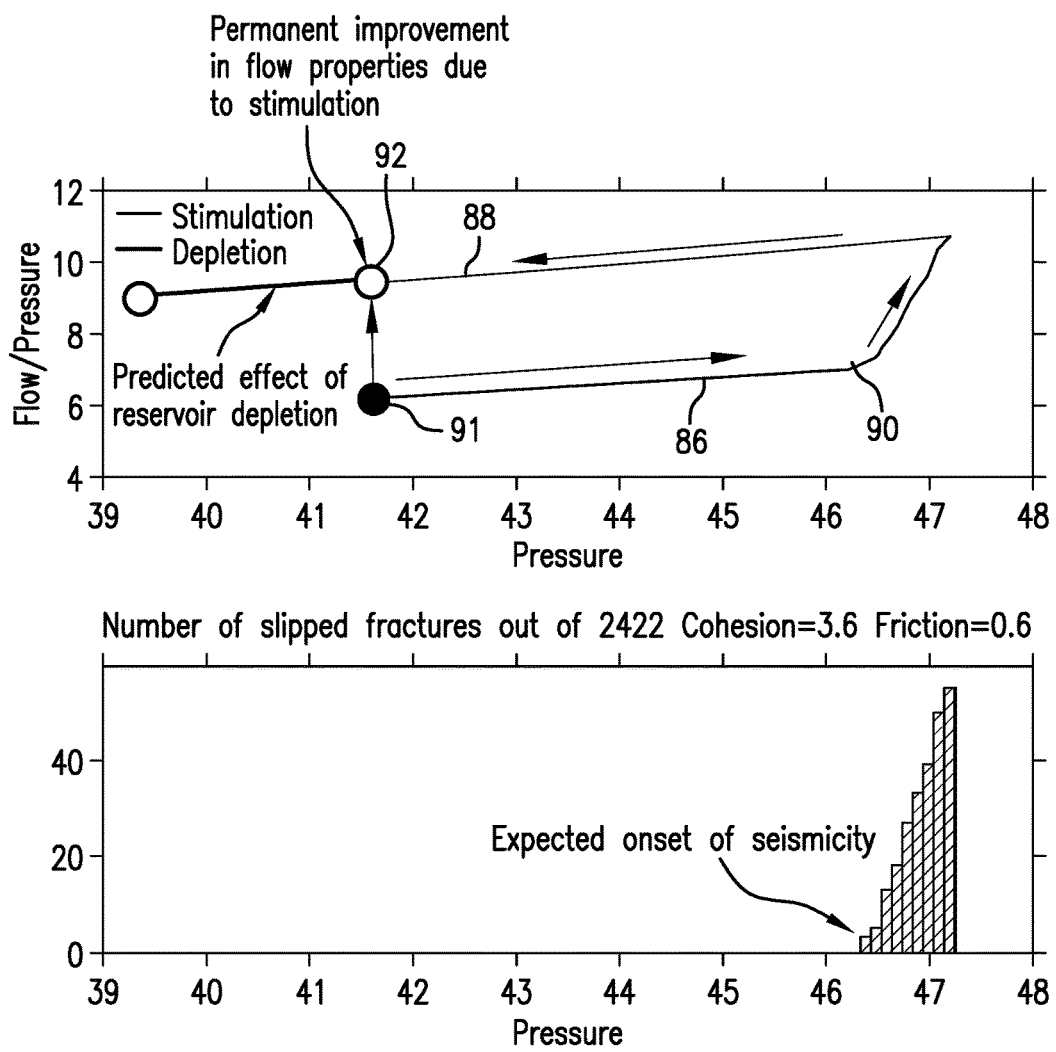
FIG. 9 illustrates uses of the model of FIG. 8 and the method of FIG. 5 to estimate various properties or characteristics relating to an earth formation and/or feature.

Referring to FIG. 9, a model constructed as shown in FIG. 8 can be used to predict various characteristics of the formation. For example, the curve 86 can be used to show the permanent improvement in flow properties due to a given stimulation pressure. The improvement is evident from the increase in flow/pressure as shown by corresponding data points 91 and 92. Curve 88 or another curve modeled base on flow-back measurements, can be used to extrapolate the effect of reservoir depletion at pressures below the pre-stimulation pressures. Furthermore, the "knee" 90 described above can be used to predict the expected onset of seismicity in response to pressure.

Having thus described aspects of the invention, it should be recognized that the system includes methods and apparatus for characterizing low-permeability formations, processing associated data, pumping fluids to pre-test the low-permeability formations, collecting data for the pumping and response characteristics, and controlling associated processes (and repeating such processes as needed). The system also includes, in one embodiment, methods and apparatuses for detecting microseismic events. Accordingly, methods and apparatus may include, a variety of instruments for characterizations downhole, sensors, pumps, fluid supplies and the like, as well as processing and controlling capabilities which may be generally, selectively, or completely linked to equipment used to effect the pre-testing and subsequent stimulation of the sub-surface materials.

A number of benefits result from implementation of the methods and apparatuses disclosed herein. For example, results provide for modeling the result of stimulation at multiple pressures and modeling the response at many stimulation pressures. Such pressures may include pressures that increase permeability, cause a change in pre-existing features such as a fracture slip, and/or cause a fracture. In another example, results provide for enhanced selection of spacing and orientation for a plurality of wellbores as well as completion designs. Exemplary aspects of completion designs that may be enhanced include determination of lengths and positions along the well of connections to the reservoir (e.g., perforated intervals) and of barriers to connection (e.g., cased and cemented but un-perforated intervals) to ensure that the entire region surrounding the well has been optimally stimulated in the most efficient manner. It is further possible to predict the production rate as a function of time as well as the ultimate recovery. The methods and apparatuses described herein allow for substantial improvement in predicting the production rate of formations relative to prior art procedures. The improved understanding of reservoirs derived by these methods and apparatuses can be used to improve recovery performance and field economics.

Utilizing an approach to predicting gas and oil shale reservoir properties based on a model that has been used successfully to optimize well performance in many naturally fractured reservoirs, it is possible to model reservoir response to stimulation and predict aspects of production. Unfortunately, existing techniques for quantitative modeling require reservoir and well test flow simulation. However, even in the absence of such analyses it is now possible to predict based on stress state and fracture properties such things as the geometry of a stimulated region as a function of pressure. Stimulation effectiveness can also be estimated if natural fracture conductivity before and after stimulation is known. With this information, it is then possible to predict where slick-water stimulation is likely to create a broad stimulated zone, and where it is not.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and "third" are used to distinguish elements and are not used to denote a particular order.

In support of the teachings herein, various analysis components may be used, including a digital system and/or an analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of evaluating an earth formation, comprising:
   injecting, by an injection mechanism, a fluid into a pre-existing formation fracture at a first pressure or a first flow rate;
   measuring, by at least one sensor, a first response from the formation at the first pressure or the first flow rate;
   injecting, by the injection mechanism, a fluid into the pre-existing formation fracture at a second pressure or a second flow rate, wherein the second pressure is sufficient to induce a shear in the pre-existing formation fracture without initiating a hydraulic fracture by the fluid at the pre-existing formation fracture;
   measuring, by the at least one sensor, a second response from the formation at the second pressure or the second flow rate; and
   estimating, by a processor operably connected to the at least one sensor, at least one property of the formation based on the first response and the second response.

2. The method of claim 1, wherein estimating includes estimating one or more pressures at which a flow property of the formation would increase by a desired amount in response to a stimulation, based on the second response.

3. The method of claim 2, wherein the flow property includes at least one of an injectivity, a conductivity, a flowability and a permeability.

4. The method of claim 2, wherein the stimulation includes injecting a stimulation fluid into the formation at a selected pressure.

5. The method of claim 4, wherein the stimulation includes inducing at least one of a slip in a fracture and an opening of a fracture.

6. The method of claim 1, wherein injecting the fluid at the second pressure or the second flow rate induces a fracture slip resulting in a permanent increase in permeability.

7. The method of claim 1, wherein the first pressure and the second pressure include a plurality of successively increasing constant pressures, and the first flow rate and the second flow rate include a plurality of successively increasing constant flow rates.

8. The method of claim 7, wherein measuring the response includes:
   recording one of:
      fluid flow rates in response to each of the first pressure and the second pressure, and
      pressures in response to each of the first flow rate and the second flow rate;
   computing a first flow property for each of the recorded fluid flow rates or pressures; and
   computing a second flow property for each of a plurality of successively decreasing pressures or successively decreasing flow rates.

9. The method of claim 8, wherein estimating includes determining whether stimulation at a selected pressure would enhance a formation flow property, by comparing the first flow property with the second flow property for a selected pressure.

10. The method of claim 1, further comprising:
    estimating a stress state of the formation; and
    estimating characteristics of the formation.

11. The method of claim 10, wherein the characteristics include at least one of an orientation, a location, a frequency, and a strength property of the formation.

12. The method of claim 10, wherein estimating characteristics includes estimating characteristics of the formation before and after injection of the fluid.

13. The method of claim 10, further comprising designing a stimulation protocol based on the first response and the second response, and the stress state and the characteristics of the formation.

14. The method of claim 1, wherein the first pressure and the second pressure include a plurality of constant pressures, and the first flow rate and the second flow rate include a plurality of constant flow rates.

15. The method of claim 1, wherein the first response is selected from at least one of a pressure required to maintain the first flow rate and a flow rate required to maintain the first pressure, and the second response is selected from at least one of a pressure required to maintain the second flow rate and a flow rate required to maintain the second pressure.

16. An apparatus for evaluating an earth formation, comprising:
    an injection mechanism configured to inject a fluid into a pre-existing formation fracture at a first pressure or a first flow rate and inject a fluid into the pre-existing formation fracture at a second pressure or a second flow rate, wherein the second pressure is sufficient to induce a shear in the pre-existing formation fracture without initiating a hydraulic fracture by the fluid at the pre-existing formation fracture;

a pumping mechanism configured to adjust at least one of a pressure and a flow rate at which the injection mechanism injects the fluid;

a sensor for estimating at least one of a pressure and a flow rate of the formation; and a processor configured to measure a first response from the formation to the first pressure or the first flow rate, measure a second response from the formation to the second pressure or the second flow rate, and estimate at least one property of the formation based on the first response and the second response.

17. The apparatus of claim 16, wherein the processor is configured to estimate one or more pressures at which a flow property of the formation would increase by a desired amount in response to a stimulation, based on the second response.

18. The apparatus of claim 17, wherein the flow property includes at least one of an injectivity, a conductivity, a flowability and a permeability.

19. The apparatus of claim 16, wherein the first pressure and the second pressure include a plurality of successively increasing constant pressures, and the first flow rate and the second flow rate include a plurality of successively increasing constant flow rates.

20. The apparatus of claim 19, wherein the processor is configured to measure the response by:

recording one of:
fluid flow rates in response to each of the first pressure and the second pressure, and
pressures in response to each of the first flow rate and the second flow rate;
computing a first flow property for each of the recorded fluid flow rates or pressures; and
computing a second flow property for each of a plurality of successively decreasing pressures or successively decreasing flow rates.

21. The apparatus of claim 20, wherein the processor is configured to determine whether stimulation at a selected pressure would enhance a formation flow property, by comparing the first flow property with the second flow property for a selected pressure.

22. The apparatus of claim 16, wherein the processor is configured to estimate a stress state of the formation and characteristics of the formation.

23. The apparatus of claim 16, wherein the first pressure and the second pressure include a plurality of constant pressures, and the first flow rate and the second flow rate include a plurality of constant flow rates.

24. The apparatus of claim 16, wherein the first response is selected from at least one of a pressure required to maintain the first flow rate and a flow rate required to maintain the first pressure, and the second response is selected from at least one of a pressure required to maintain the second flow rate and a flow rate required to maintain the second pressure.

* * * * *